United States Patent
Conseil et al.

(10) Patent No.: US 9,467,055 B2
(45) Date of Patent: Oct. 11, 2016

(54) METHOD OF FORMING A POWER SUPPLY CONTROLLER AND STRUCTURE THEREFOR

(71) Applicants: Stephanie Conseil, Colomiers (FR); Joel Turchi, Gagnac sur Garonne (FR)

(72) Inventors: Stephanie Conseil, Colomiers (FR); Joel Turchi, Gagnac sur Garonne (FR)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 244 days.

(21) Appl. No.: 13/944,051

(22) Filed: Jul. 17, 2013

(65) Prior Publication Data
US 2015/0023064 A1 Jan. 22, 2015

(51) Int. Cl.
*H02M 3/335* (2006.01)
*H02M 1/42* (2007.01)
*H02M 1/00* (2006.01)

(52) U.S. Cl.
CPC ....... *H02M 3/33507* (2013.01); *H02M 1/4258* (2013.01); *H02M 2001/0025* (2013.01); *Y02B 70/126* (2013.01)

(58) Field of Classification Search
USPC .............. 363/20, 21.04, 21.05, 21.07, 21.08, 363/21.09, 21.1, 21.11, 21.12, 21.13, 21.15, 363/21.16, 21.17, 21.18, 89, 90, 97
See application file for complete search history.

(56) References Cited

U.S. PATENT DOCUMENTS 8,971,076 B2 * 3/2015 Nate .................. H02M 1/4225
323/207
2013/0051090 A1 * 2/2013 Xie et al. .................. 363/21.17

OTHER PUBLICATIONS

"iW3610 AC/DC Digital Power Controller for Dimmable LED Drivers", Rev. 1.5, Feb. 1, 2012, © 2012 iWatt, Inc., 17 pages.
"LNK403-410/413-420—LinkSwitch-PH LED Driver IC Family, Single-Stage PFC, Primary-Side Constant Current Control and TRIAC Dimming/Non-Dimming Options", Rev. E 05/12, Power Integrations, © 2012, Power Integrations, Inc., 20 pages.

* cited by examiner

*Primary Examiner* — Nguyen Tran
(74) *Attorney, Agent, or Firm* — Robert F. Hightower (57) ABSTRACT

In one embodiment, a method of forming a power supply controller includes forming the power supply controller to receive an input signal that is representative of an ac signal, and forming the power supply controller to form an average value of an output current over a period of a drive signal that is formed by the power supply controller to have a waveshape of substantially one of a squared version of the input signal or a waveshape of the input signal.

20 Claims, 8 Drawing Sheets

METHOD OF FORMING A POWER SUPPLY CONTROLLER AND STRUCTURE THEREFOR

BACKGROUND OF THE INVENTION

The present invention relates, in general, to electronics, and more particularly, to semiconductors, structures thereof, and methods of forming semiconductor devices.

In the past, the semiconductor industry utilized various methods and circuits to form power supplies for applications such as to supply power to light emitting diode (LED) light sources or battery chargers and various other applications. Typically, the power supplies used isolated fly-back converters in order to provide isolation between the input and output elements. These isolated fly-back converters typically included a feedback circuit that provided information about the condition of the output voltage. These feedback circuits often included optical coupler elements or transformers to provide isolation between the input and output elements. The optical coupler and/or transformer elements added cost to the system. The converters may also have included circuits that provided information about the output current.

Additionally, it was desirable for the power supply system to have a high power factor such as a power factor greater than 0.7. However, power supplies for these applications often did not provide adequate power factor correction.

Accordingly, it is desirable to have a power supply and/or controller therefor which has a lower cost and that has a high power factor correction. It may also be desirable to have a power supply and/or controller therefor which provides such features using only information on a primary side of the power supply.

For simplicity and clarity of the illustration(s), elements in the figures are not necessarily to scale, and the same reference numbers in different figures denote the same elements, unless stated otherwise. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, or certain N-type or P-type doped regions, a person of ordinary skill in the art will appreciate that complementary devices are also possible in accordance with the present invention. One of ordinary skill in the art understands that the conductivity type refers to the mechanism through which conduction occurs such as through conduction of holes or electrons, therefore, and that conductivity type does not refer to the doping concentration but the doping type, such as P-type or N-type. It will be appreciated by those skilled in the art that the words during, while, and when as used herein relating to circuit operation are not exact terms that mean an action takes place instantly upon an initiating action but that there may be some small but reasonable delay(s), such as various propagation delays, between the reaction that is initiated by the initial action. Additionally, the term while means that a certain action occurs at least within some portion of a duration of the initiating action. The use of the word approximately or substantially means that a value of an element has a parameter that is expected to be close to a stated value or position. However, as is well known in the art there are always minor variances that prevent the values or positions from being exactly as stated. It is well established in the art that variances of up to at least ten percent (10%) (and up to twenty percent (20%) for semiconductor doping concentrations) are reasonable variances from the ideal goal of exactly as described. When used in reference to a state of a signal, the term "asserted" means an active state of the signal and the term "negated" means an inactive state of the signal. The actual voltage value or logic state (such as a "1" or a "0") of the signal depends on whether positive or negative logic is used. Thus, asserted can be either a high voltage or a high logic or a low voltage or low logic depending on whether positive or negative logic is used and negated may be either a low voltage or low state or a high voltage or high logic depending on whether positive or negative logic is used. Herein, a positive logic convention is used, but those skilled in the art understand that a negative logic convention could also be used. The terms first, second, third and the like in the claims or/and in the Detailed Description of the Drawings, as used in a portion of a name of an element are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

The drawings described are only schematics and are non-limiting. In the drawings, the size of some of the elements may be exaggerated and not drawn on scale for illustrative purposes. The dimensions and the relative dimensions do not correspond to actual reductions to practice of the invention.

DETAILED DESCRIPTION OF THE DRAWINGS

Figure 1:
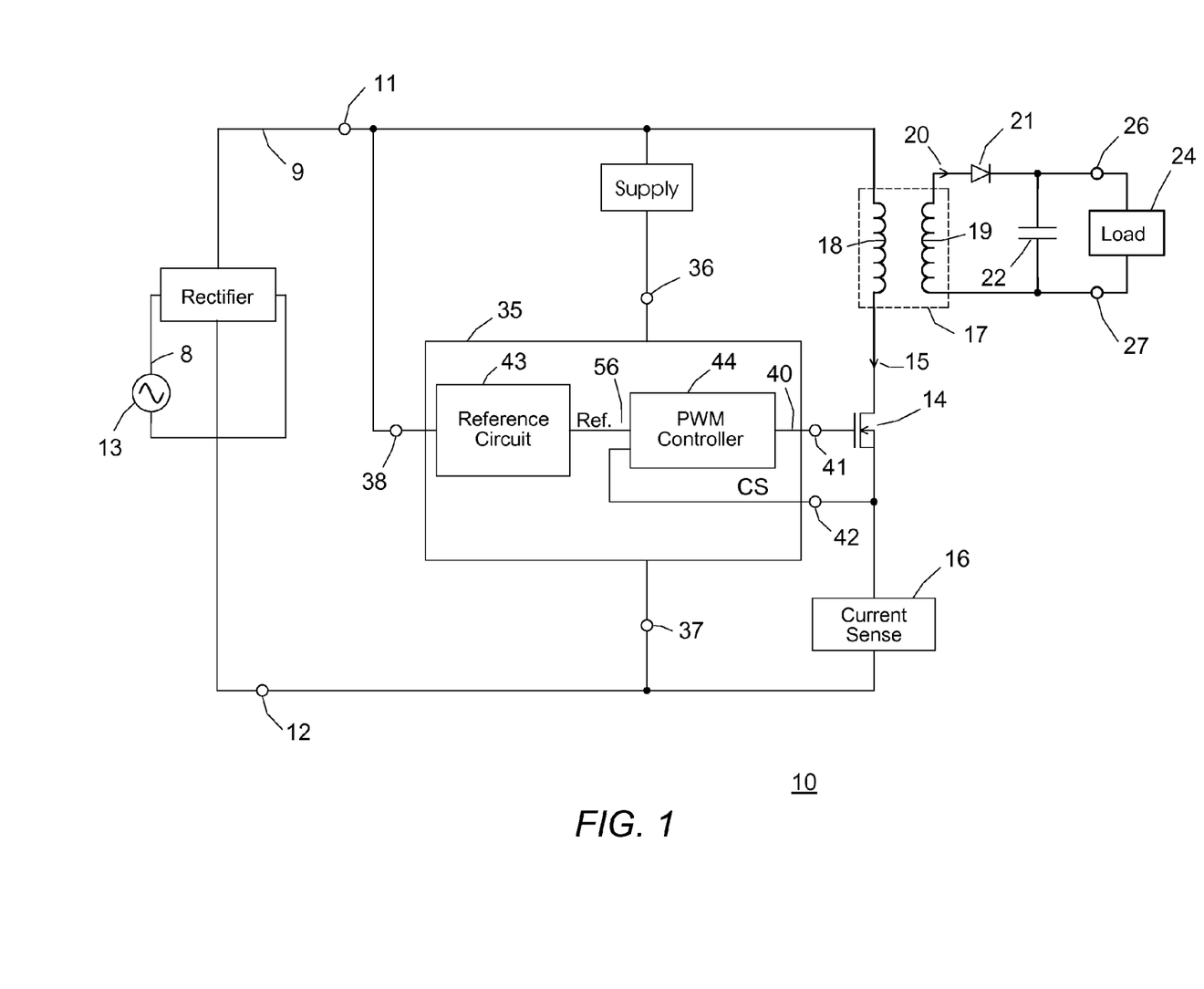
FIG. 1 schematically illustrates an example of an embodiment of a portion of a power supply system that includes a power supply controller in accordance with the present invention.

FIG. 1 schematically illustrates an example of an embodiment of a portion of a power supply system 10 that has reduced cost and an improved power factor correction. System 10 includes an AC voltage source 13 that generates an AC input voltage 8, such as a bulk AC input voltage of a household mains or other voltage source. Voltage 8 has a period that is determined by the frequency of source 13 which typically is either fifty or sixty hertz (50 or 60 Hz) but may be other frequencies in other applications. Those skilled in the art will also appreciate that voltage 8 typically has an envelope waveshape of a sine waveshape. System 10 usually is rectified by a rectifier such as a full wave bridge rectifier to form a voltage signal 9 that is representative of voltage 8. A voltage input terminal 11 and a common return terminal 12 of system 10 receives signal 9.

System 10 also typically includes a primary side power supply controller 35, a switch, such as a transistor 14, and a transformer 17 that has a primary winding 18 and a secondary winding 19 that is utilized to isolate elements of system 10. The secondary side of system 10 typically includes another rectifier that rectifies the signal from winding 19, such as a diode 21. A storage and filter capacitor 22 on the secondary side assists in forming an output voltage between an output terminal 26 and output return terminal 27 of system 10. A load 24 typically is connected between terminals 26 and 27 to receive an output current 20 and the output voltage.

Controller 35 includes an input 38 that is configured to receive a first signal that is representative of voltage 8, such as signal 9 for example, and an output 41 that is configured to provide a drive signal 40 to the power switch, such as transistor 14, to control transistor 14 in order to form and control output current 20. Controller 35 also includes a current sense input 42 that is configured to receive a current sense (CS) signal that is representative of the value of a primary current 15 that flows through transistor 14 and primary winding 18. A current sense element 16 usually assists in forming the CS signal. Element 16 may have various implementations including a sense element of a senseFET type of transistor, a series resistor, or a capacitor divider or other well-known current sensing element.

Figure 5:
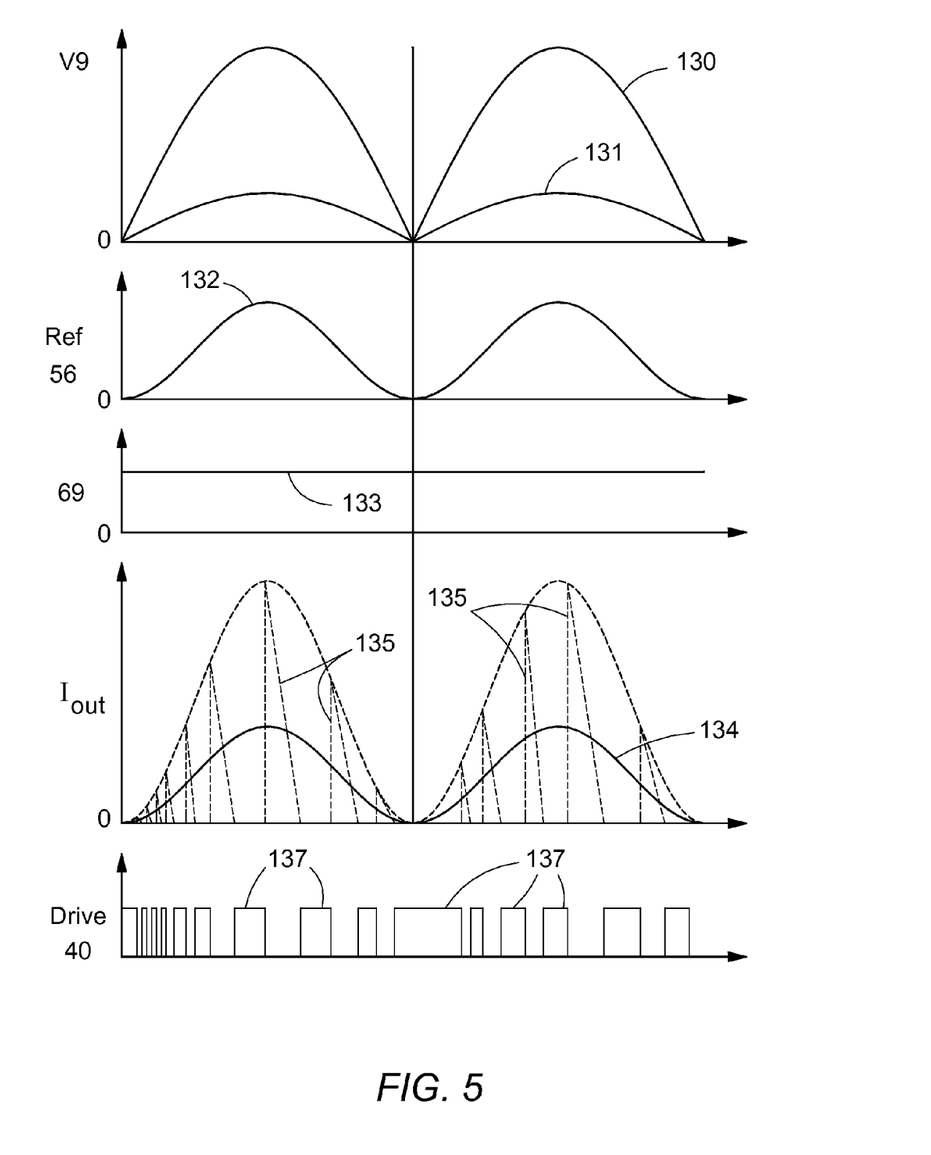
FIG. 5 is a graph having plots of some of the signals described in the description of FIGS. 1-4 and 6 in accordance with the present invention.

Controller 35 is configured to form current 20 to have an average value, over the period of drive signal 40, with a waveshape of substantially a squared sine waveshape. In another embodiment, controller 35 is configured to form an average value of current 20 over the period of voltage 8 to be substantially constant. As will be seen further hereinafter, some examples of current 20 are illustrated in FIG. 5 (for example plots 134 and 135).

Controller 35 typically includes a reference circuit 43 and a PWM controller 44. As will be seen further hereinafter reference circuit 43 is configured to receive the signal that is representative of voltage 8 and form a reference (Ref) signal 56 having a waveshape that is representative of the waveshape of voltage 8 squared, thus a squared sine waveshape. Circuit 43 is also configured to form an average value of signal 56, such as the average value over the period of voltage 8, to be substantially constant. As will be seen further hereinafter, some examples of reference signal (REF) 56 are illustrated in FIG. 5 (for example plot 132).

In the preferred embodiment, controller 35 does not receive a signal that is representative of the value of the output voltage formed between terminals 26 and 27, thus controller 35 is configured to control current 20 without being configured to receive a feedback signal from the secondary side and without being configured to receive a signal from an optical coupler. Thus, is devoid of an optical coupler configured to form a feedback signal that is representative of the value of the output voltage. Additionally, controller 35 is configured to regulate the value of current 20 using only signals formed by primary winding 18 and without signal from a secondary winding of transformer 17. This preferred embodiment assists in reducing the cost of controller 35 and the system that uses controller 35, such as system 10. In another embodiment, controller 35 is also configured to control current 20 without being configured to receive a feedback signal from an optical coupler that is representative of current 20.

Controller 35 is configured to receive an operating voltage for operating controller 35 between a voltage input 36 and a voltage return 37. Return 37 typically is connected to common return terminal 12. A power supply may be utilized to receive signal 9 and provide the operating voltage to input 36.

Figure 2:
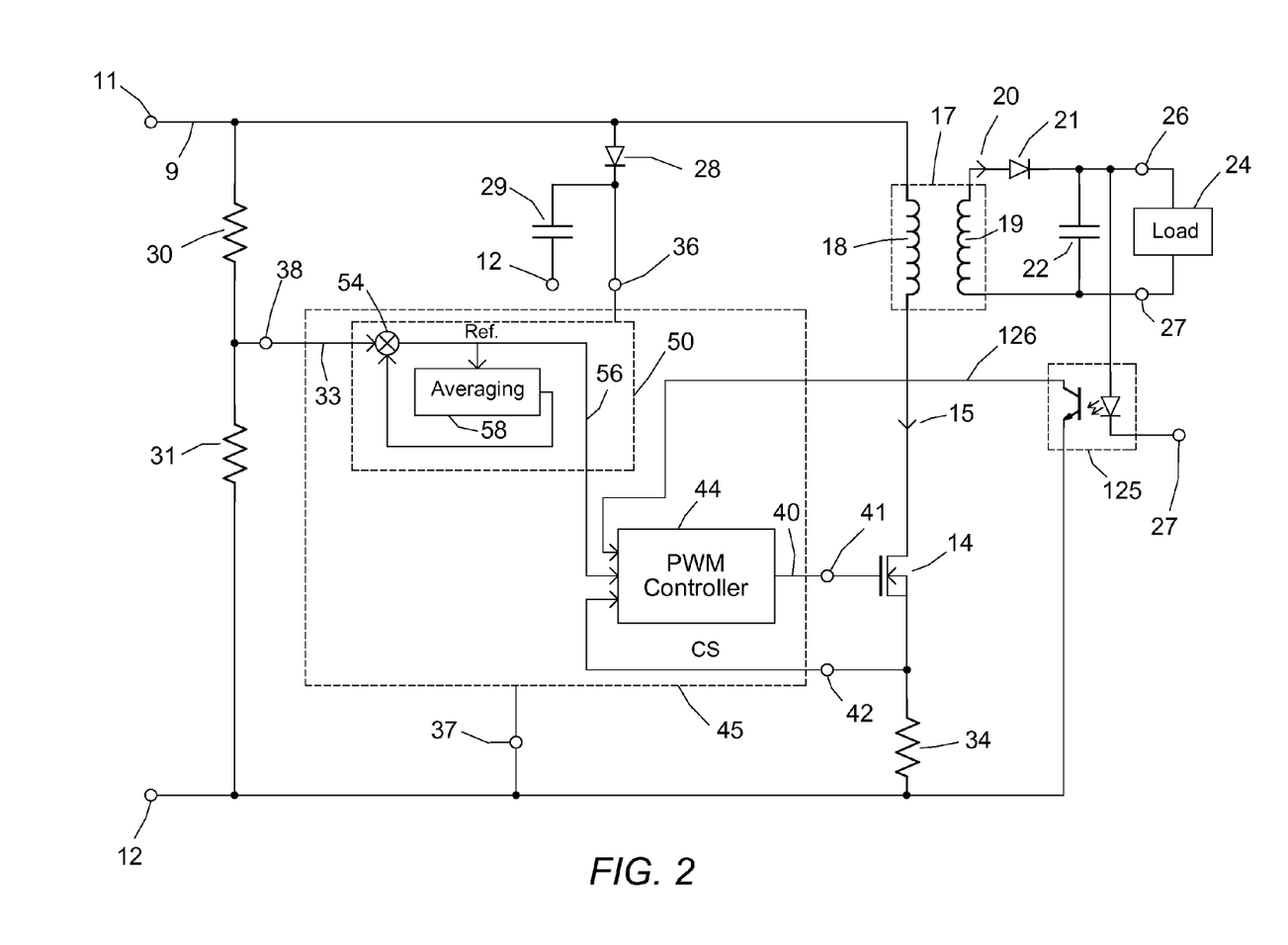
FIG. 2 schematically illustrates an example of an embodiment of a portion of a power supply controller that is an alternate embodiment of the power supply controller of FIG. 1 in accordance with the present invention.

FIG. 2 schematically illustrates an example of an embodiment of a portion of a power supply controller 45 that is an alternate embodiment of controller 35 that was explained in the description of FIG. 1. One example of the power supply, to provide the operating voltage for controller 45 explained in the description of FIG. 1, may include a diode 28 that receives signal 9 and a capacitor 29. In other embodiments, the power supply configuration may include a zener diode, or a linear voltage regulator, or some other well-known power controller instead or in addition to one or both of diode 28 and capacitor 29. In some embodiments input 36 may be configured to receive signal 9 as the operating voltage from terminal 11. A resistor 34 is an alternate embodiment of the current sense element described in the description of FIG. 1.

Controller 45 includes a reference circuit 50 that is similar to and is an alternate embodiment of circuit 43 that was described in the description of FIG. 1. Circuit 50 is configured to receive on input 38 a first signal 33 that is representative of voltage 8 and/or signal 9. Typically, the value of signal 9 is much greater than can be accepted by the circuits of controller 45, thus, a resistor divider of resistors 30 and 31 is utilized to reduce the value of signal 9 to the value of signal 33. In other embodiments, other means may be utilized to form signal 33 to be representative of voltage 8.

FIG. 5 is a graph having plots of some of the signals of a system that may include controller 45, such as system 10 (FIG. 1). The abscissa indicates time and the ordinate indicates increasing value of the illustrated signal. A plot 130 illustrates the envelope waveshape of signal 9 and a plot 131 illustrates the envelope waveshape of signal 33. A plot 132 illustrates the sine squared waveshape of reference (Ref) signal 56. A plot 133 illustrates a correction signal 69 as will be seen hereinafter. A plot 134 illustrates the average value of current 20 over the period of drive signal 40, while a plot 135 illustrates the instantaneous shape of current 20, and a plot 137 illustrates drive signal 40. This description includes references to FIG. 2 and FIG. 5.

Those skilled in the art will appreciate that the envelope waveshape of voltage 8 is a sine wave, therefore the envelope waveshape of signal 9 is a rectified sine wave that is representative of voltage 8 including that the peak and zero values of signal 9 correspond to the peak and zero values of voltage 8. Circuit 50 is configured to multiply signal 33 times itself in order to form signal 56 with the sine squared envelope waveshape as illustrated by plots 131 and 132. A multiplier 54 is utilized to perform the multiplication of signal 33. Those skilled in the art will appreciate that squaring a rectified sine wave, such as signals 9 and/or 33, forms a signal that is substantially equivalent to a squared sine wave as illustrated in the following equation:

$$(V_p \cdot \sin(\omega t))^2 = (-V_p \cdot \sin(\omega t))^2 = V_p^2 \cdot \sin^2(\omega t)$$

Circuit 50 is also configured to form an average value of signal 56 to be substantially constant over the period of voltage 8 (FIG. 1). An averaging circuit 58 of circuit 50 is configured to receive signal 56 and form a correction signal 69 that is used to maintain the average value of signal 56 substantially constant over the period of voltage 8. In an embodiment, signal 69 is used to control the operation of multiplier 54 to control the average value of signal 56 to be substantially constant.

In one embodiment, controller 45 is configured to use signal 56 to control current 20 so that the average value of current 20 over the period of signal 40 has an envelope waveshape that is substantially the sine squared waveshape as illustrated by plot 134. In another embodiment, controller 45 is also configured to control the average value of current 20 over the period of voltage 8 to be substantially constant and proportional to the average value of signal 56.

In an optional embodiment, controller 44 may also be configured to receive a feedback signal that is representative of the value of the output voltage between terminals 26 and 27 and to regulate the value of the output voltage to a desired value. For such an example embodiment, the system that uses controller 45 may include an optical coupler 125 that receives the output voltage and forms the feedback signal.

Figure 3:
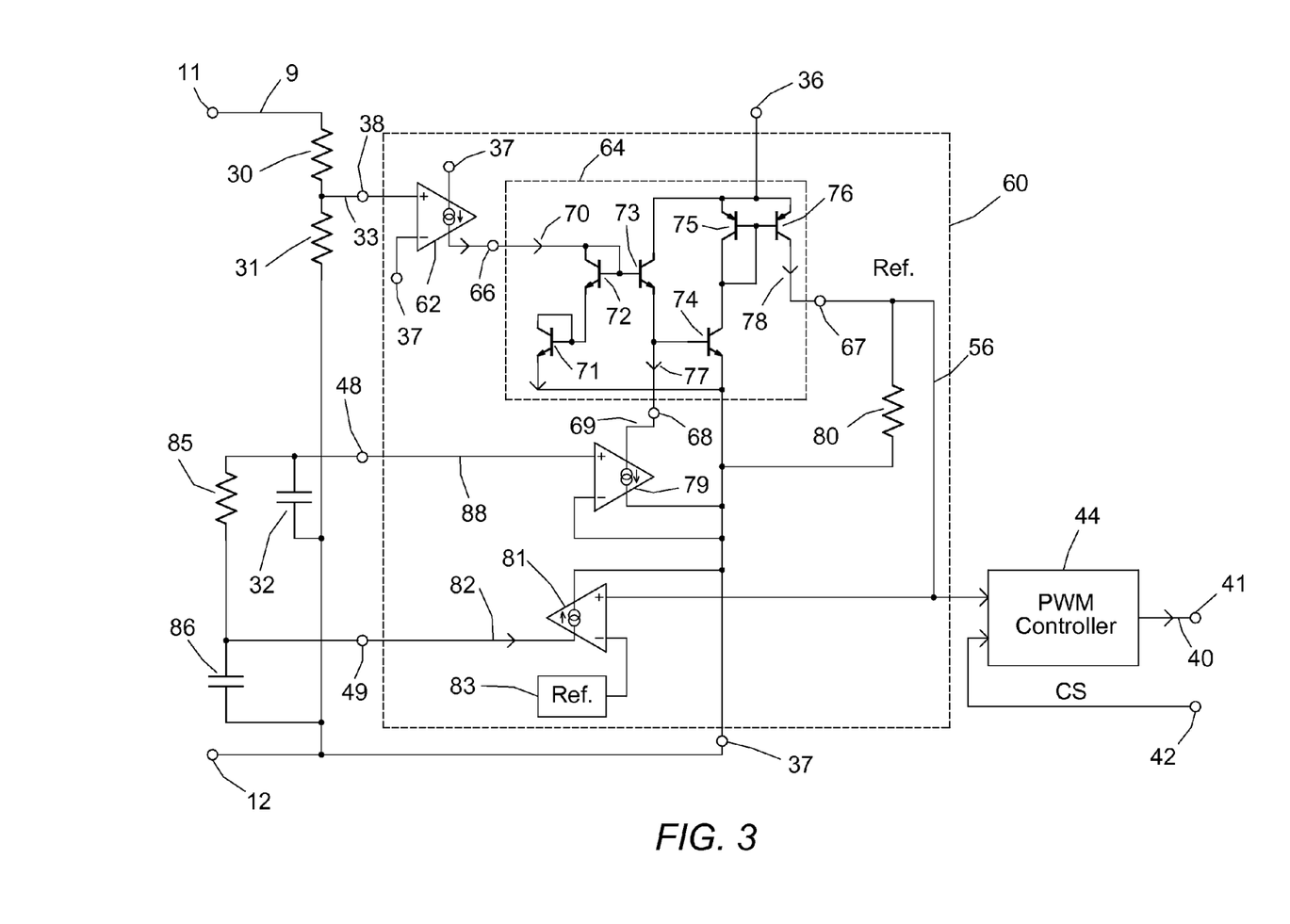
FIG. 3 schematically illustrates an example of an embodiment of a portion of a reference circuit that is an alternate embodiment of the reference circuit of FIGS. 1-2 in accordance with the present invention.

FIG. 3 schematically illustrates an example of an embodiment of a portion of a reference circuit 60 that is an alternate embodiment of circuits 43 and 50. Circuit 60 includes a multiplier 64 that is similar to and an alternate embodiment of multiplier 54. An averaging circuit of circuit 60 includes transconductance amplifiers 79 and 81, and is an alternate embodiment of circuit 58 (FIG. 2). The specific illustrated example circuit of multiplier 64 is configured to operate on currents instead of voltages. Consequently, circuit 60 and the averaging circuit include transconductance amplifiers that also operate on currents. In other embodiments, the circuit of multiplier 64 and the type of amplifiers may be different such as configured to operate on voltages instead of currents or operate on both. The circuit configuration of multiplier 64 is well known to those skilled in the art. For example, those skilled in the art understand translinear circuits.

A transconductance amplifier 62 receives signal 33 and converts it to a current 70 that is applied to an input 66 multiplier 64. The current from amplifier 62 is representative of voltage 8 including representative of the envelope waveshape of voltage 8. Multiplier 64 multiplies the current signal from amplifier 62 times itself to form a current 78 on an output 67 such that current 78 has an envelope waveshape of a squared sine wave. A resistor 80 converts current 78 into a voltage to form reference signal 56, as illustrated by plot 132. In other embodiments, resistor 80 may be replaced by a current to voltage circuit that includes an operational amplifier or by a shunt regulator or by another circuit that converts a current to a voltage. PWM controller 44 receives signal 56 and uses signal 56 to control current 20.

A transconductance amplifier 81 of the averaging circuit 60 receives signal 56 and forms an error signal 82 representing a deviation of the average value of signal 56 from a desired average value of signal 56. Amplifier 81 receives signal 56 on a non-inverting input and a fixed reference signal from a fixed reference circuit or Ref 83 on an inverting input and forms error signal 82. For example, signal 82 may be formed by amplifying a deviation between the predetermined value from Ref 83 and signal 56. The averaging circuit forms an average value of error signal 82 and uses the average value of error signal 82 to form a correction signal 69 that is used to modulate a scaling current 77 of multiplier 64 to maintain the average value of signal 56 substantially constant. Another embodiment also includes that the averaging circuit is configured to maintain the average value of signal 56 substantially equal to the value of reference 83. Amplifier 81 is configured to form error signal 82 as a current and configured to supply the current to an integrating and filtering network that includes a resistor 85 and capacitors 32 and 86. However, those skilled in the art will appreciate that in an embodiment the error signal may also be formed as a voltage. In the preferred embodiment, capacitor 86 is configured to integrate the instantaneous value of error signal 82 to form a signal 88 representing the average value of error signal 82. Capacitor 32 and resistor 85 assist in filtering the average value signal. Capacitors 32 and 86 along with resistor 85 usually are external to circuit 60 but any of these may be included within circuit 60 in some embodiments. A transconductance amplifier 79 receives the signal representative of the average value of error signal 82 on an input 48 and forms correction signal 69 that is applied to a scaling input 68 of multiplier 64 as illustrated by a plot 133. Although signal 69 is illustrated as a current 77, it may be a voltage in other embodiments. Multiplier 64 adjusts or modulates the value of current 78 responsively to signal 69 to either increase or decrease the value of signal 56 so that the average value of signal 56 remains substantially constant. In another embodiment, circuit 60 is configured to form the average value of signal 56 over the period of voltage 8 to be substantially equal to a predetermined value, for example substantially proportional to the value of the reference signal formed by Ref 83. Those skilled in the art will understand that the average value of signal 56 may vary within a range of values around the target value represented as proportional to the value of the reference signal formed by Ref 83. For example, the target value may be one volt (1 V) and the range of values may be plus or minus five or ten percent (5%-10%) around the one volt.

The instantaneous value of signal 56 can be represented by the equation:

$$V56 = R80 * K^2 * (V33 * V33)/I77$$

where;
K is a gain of the voltage-to-current conversion of amplifier 62,
V56 is the instantaneous voltage of signal 56,
V33 is the instantaneous voltage of on input 66, and
I77 is the value of current 77 from signal 69.

Since signal 33 is a sinusoid, then signal 56 is a squared sinusoid. Controller 60 is configured such that the average value of current 20, over the period of voltage 8, is formed to be substantially proportional to the average value of signal 56 and can be represented by the equation:

$$I20,\text{avg} = V56\text{avg}/(2*N*R34)$$

where;
I20,avg is the average value of current 20 over the period of voltage 8,
N is a constant,
R34 is the value of current sense resistor 34; and
V56avg is the average value of signal 56.

Those skilled in the art will understand that the average value of current 20 may vary within a range of values around the target value represented in the equation. For example, the target value may be one ampere (1 Amp) and the range of values may be plus or minus five or ten percent (5%-10%) around the one ampere. In another embodiment, capacitor 86 and resistor 85 may be omitted and the output of amplifier 81 may be connected to the input of amplifier 79. In such a configuration, output 49 may also be omitted.

Input 66 of multiplier 64 is configured to receive the signal that is representative of signal 8. Output 67 of multiplier 64 is configured to form Ref signal 56 which is connected to a non-inverting input of amplifier 81. An inverting input of amplifier 81 is connected to receive a reference voltage from a reference 83. A current output of amplifier 81 is configured to form error signal 82. A non-inverting input of amplifier 79 is configured to receive signal 88 that is representative of the average value of error signal 82. An inverting input of amplifier 79 is connected to receive the common return signal from return 37. An output of amplifier 79 is configured to form correction signal 69 which is connected to scaling input 68 of multiplier 64.

Figure 4:
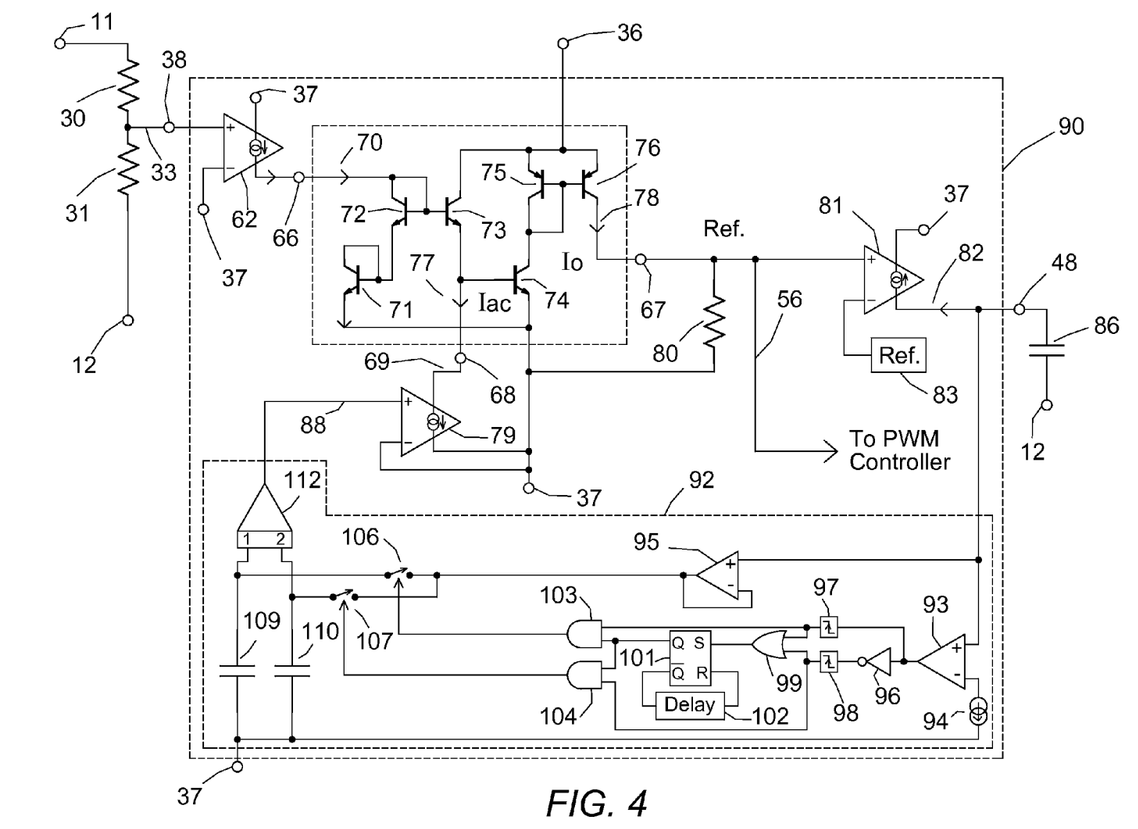
FIG. 4 schematically illustrates an example of an embodiment of a portion of a reference circuit that is an alternate embodiment of the reference circuit of FIGS. 1-3 in accordance with the present invention.

FIG. 4 schematically illustrates an example of an embodiment of a portion of a reference circuit 90 that is an alternate embodiment of reference circuits 43, 50, and 60. Circuit 90 is similar to circuits 43, 50, and 60, except that an averaging circuit 92 is used as an alternate embodiment of the averaging circuit described in the description of FIG. 3. Circuit 92 is configured to use signal 82 to determine the average value of signal 56. Circuit 92 is configured to detect the state of amplifier 81 sourcing current (as one state) or sinking current (as another state) and to use these two states to form an average value of signal 82. Circuit 92 includes a sample-and-hold circuit that is used to sample the maximum value and a minimum value of signal 82 (or a signal that is representative of signal 82) and use the maximum and minimum values to control the average value of signal 56. In another embodiment, the sample-and-hold circuit uses the maximum and minimum values of signal 82 to calculate an average value of signal 82. Error signal 82 from amplifier 81 has as a.c. component that has the same waveshape as a signal 56.

Averaging circuit 92 includes a current comparator 93 that detects when the current from signal 82 is being sourced from amplifier 81 or is being sunk by amplifier 81. An amplifier 95 functions as a buffer to prevent circuit 92 from loading the output of amplifier 81 and from affecting error signal 82. As amplifier 82 begins sourcing current (for example if the value of signal 56 is no less than the Ref 83), the output of comparator 93 goes high indicating that the value of signal 82 is increasing. An edge detector 97 detects that the output of comparator 93 goes high and generates a pulse. The high from edge detector 97 forces the output of an OR gate 99 high to set a latch 101. Setting latch 101 causes the Q output to go high. The high from latch 101 and the high from detector 97 forces the output of an AND gate 103 to go high and close a switch 106. Closing switch 106 connects a capacitor 109 to be charged by an amplifier 95. Switch 106 remains closed charging capacitor 109 for a time established by a delay circuit or delay 102. Thereby allowing capacitor 109 to charge to a value that is representative of the minimum value of signal 82, such as the minimum instantaneous value for example. After the time of delay 102, switch 106 is opened.

When the value of signal 56 decreases to no greater than the value of Ref 83, amplifier 81 begins sinking current instead of sourcing current. Comparator 93 detects that the current of signal 82 has changed state which forces the output of comparator 93 low. The low from comparator 93 is detected by an edge detector 98 which forces the output of OR gate 99 high to again set latch 101. The high Q output of latch 101 and the high from detector 98 force the output of an AND gate 104 high thereby closing a switch 107. Closing switch 107 couples a capacitor 110 to the output of amplifier 95 so that capacitor 110 charges to a value which is representative of the maximum value of signal 82. A summing circuit 112 sums the voltages from capacitors 109 and 110 to form signal 88 indicating the average value of error signal 82.

Averaging circuit 92 has an input connected to the output of amplifier 81 to receive error signal 82. Comparator 93 has a non-inverting input connected to the input of circuit 92 and an inverting input connected to receive a reference signal 94. An output of comparator 93 is connected to an input of edge detector 97 and to an input of inverter 96 which has an output connected to an input of edge detector 98. An output of edge detector 97 is connected to a first input of OR gate 99 and a first input of AND gate 103. The output of edge detector 98 is connected to a second input of or gate 99 and to a first input of and gate 104. An output of or gate 99 is connected to a set input of latch 101. A reset input of latch 101 is connected to an output of a delay 102 which has an input connected to a cube or output of latch 101. A Q output of latch 101 is connected to a second input of gate 103 and to a second input of gate 104. An output of gate 103 is connected to a control input of switch 106. An input of switch 106 is connected to an output of amplifier 95 and an output of switch 106 is connected to a first input of summing circuit 112. A first terminal of capacitor 109 is connected to the output of switch 106 and a second terminal of capacitor 109 is connected to return 37. An output of gate 104 is connected to a control input of switch 107. An input of switch 107 is connected to the output of amplifier 95 and an output of switch 107 is connected to a second input of circuit 112. A first terminal of capacitor 110 is connected to the output of switch 107 and a second terminal of capacitor 110 is connected to return 37.

Figure 6:
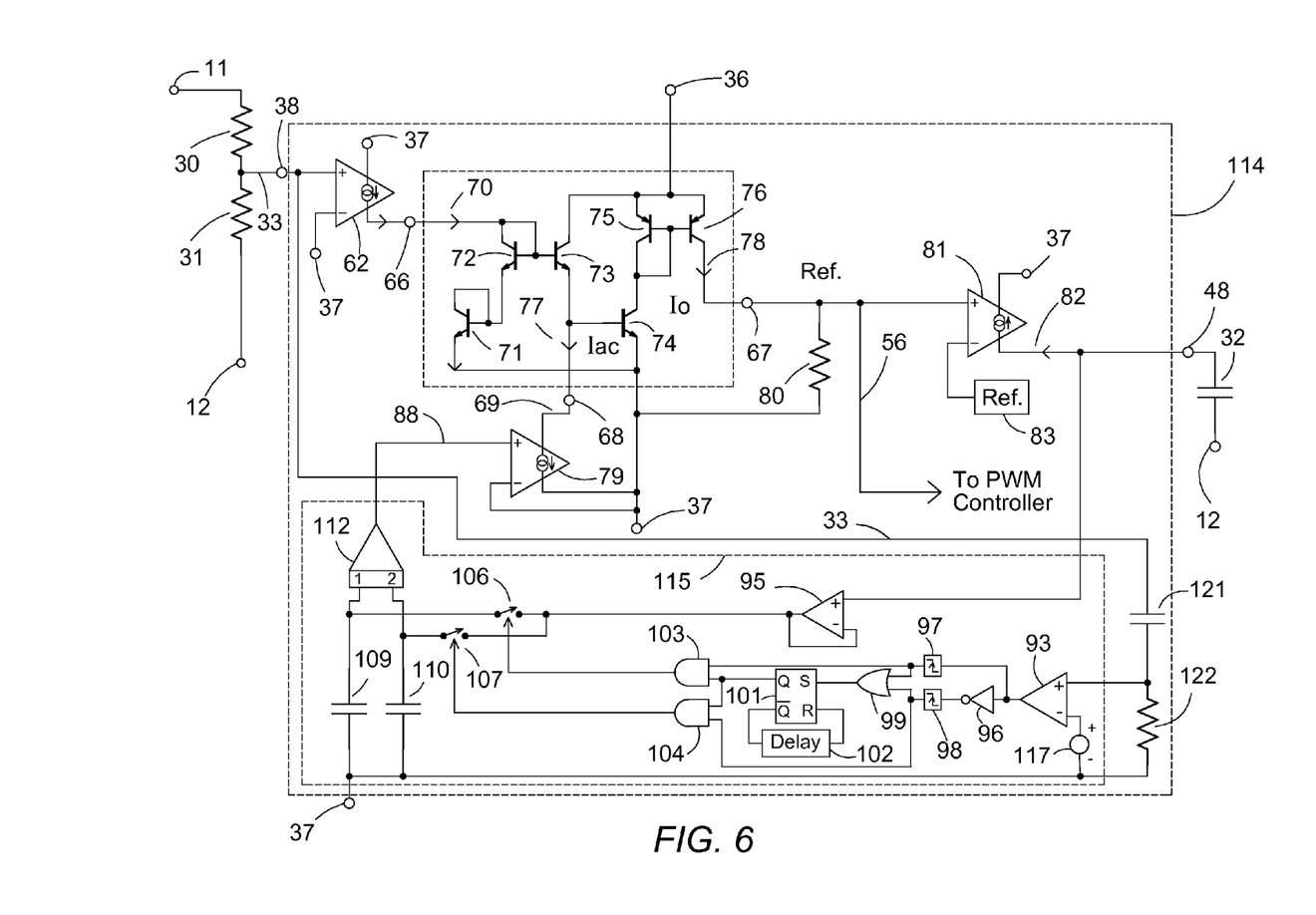
FIG. 6 schematically illustrates an example of an embodiment of a portion of a reference circuit that is an alternate embodiment of the reference circuit of FIGS. 1-4 in accordance with the present invention.

FIG. 6 schematically illustrates an example of an embodiment of a portion of a reference circuit 114 which includes an averaging circuit 115. Circuit 114 is similar to circuit 90 except that an averaging circuit 115 is used as an alternate embodiment of averaging circuit 92 described in the description of FIG. 4. In one embodiment, circuit 115 is similar to circuit 92 except that circuit 115 is configured to sample the value of signal 82 (or a signal that is representative of signal 82) responsively to a minimum and a maximum value of voltage 8. In order to facilitate this operation, current reference 94 is replaced by a voltage from a fixed voltage reference 117 which is applied to the inverting input of comparator 93. Circuit 115 is configured to have the output of comparator 93 go high in response to voltage 8 starting to increase from a minimum value and for the output to go low in response to voltage 8 starting to decrease from a maximum value. A differentiator circuit is configured to receive a signal that is representative of voltage 8, such as signal 33, and form pulses at the rising and falling edges of voltage 8. These pulses are representative of voltage 8 respectively increasing from a minimum value of voltage 8 and decreasing from a maximum value of voltage 8.

Figure 7:
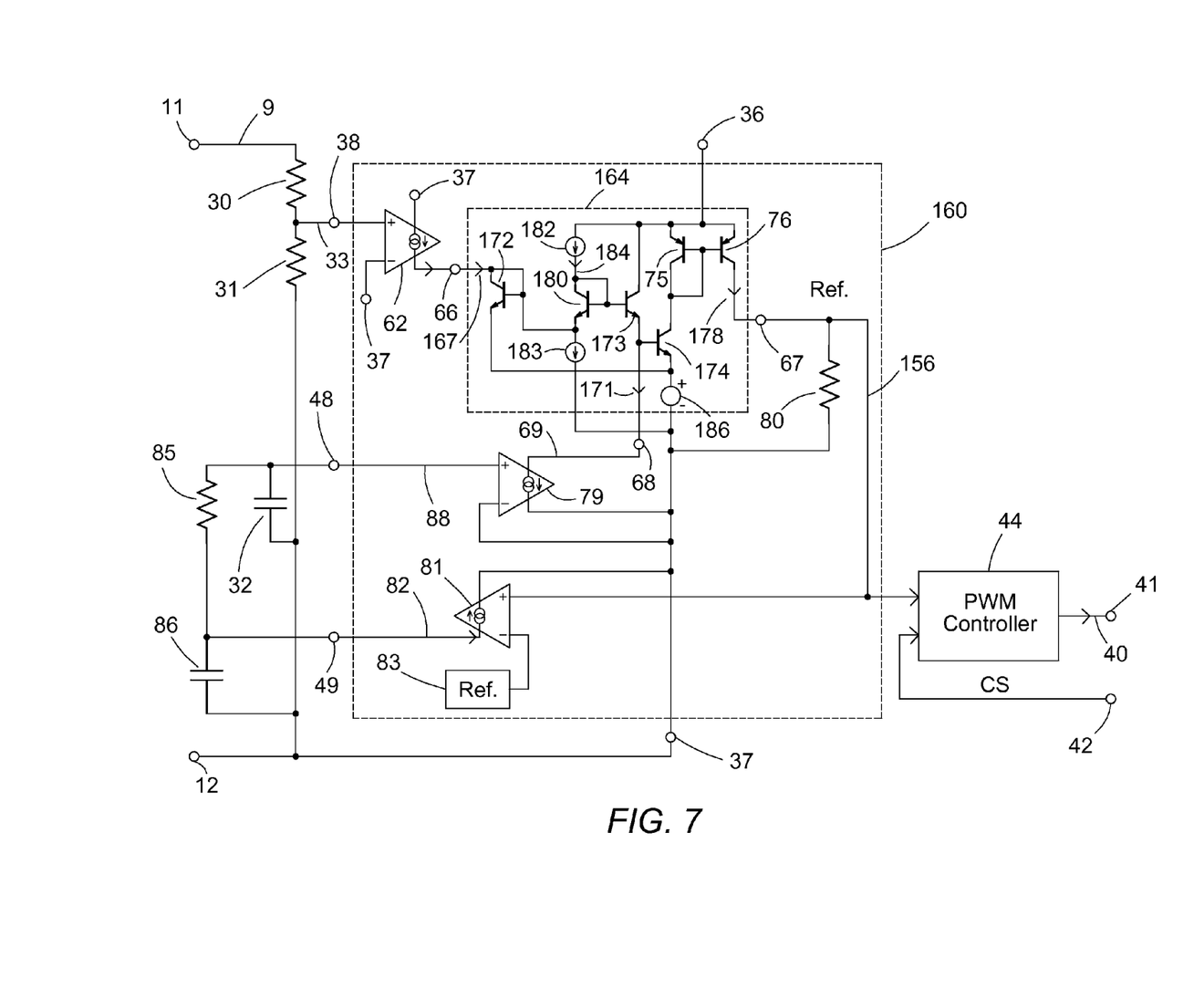
FIG. 7 schematically illustrates an example of an embodiment of a portion of a reference circuit that is an alternate embodiment of reference circuits of FIGS. 1-4 and 6 in accordance with the present invention.

FIG. 7 schematically illustrates an example of an embodiment of a portion of a reference circuit 160 that is an alternate embodiment of reference circuits 43, 50, 60, 90, and 114. Circuit 160 is similar to circuits 43, 50, 60, 90, and 114, except that circuit 160 is configured to form current 20 to have an average value, over the period of drive signal 40, with a waveshape of substantially a sine waveshape.

Circuit 160 includes a shaping circuit 164. Circuit 164 is configured to receive the signal that is representative of voltage 8 and form a reference (Ref) signal 156 having a waveshape that is representative of the waveshape of voltage 8. In one embodiment, voltage 8 is representative of a sine waveshape. Circuit 160 is configured to form the average value of signal 156 over the period of voltage 8 to be substantially the same as the average value of signal 56. The value and waveshape of signal 82 is substantially the same as for signal 82 of circuit 60. In an embodiment, current sources 182 and 183 form substantially equal currents such as current 184. The value of reference current 178 of circuit 164 can be represented by the equation:

$$I178=I167*I184/I171$$

where;
  I178 is the value current 178 of circuit 164,
  I167 is the input current into circuit 164,
  I184 is the value of current 184 from current sources 182 or 183, and
  I171 is the value of current 171 from signal 69.

The instantaneous value of signal 156 can be represented by the equation:

$$V156=R80*K*V33*I184/I171$$

where;
  K is a gain of the voltage-to-current conversion of amplifier 62,
  V156 is the instantaneous voltage of signal 156,
  R80 is the resistance of resistor 80
  V33 is the instantaneous voltage of on input 66, and
  I171 is the value of current 171 from signal 69.

Since signal 33 is a sinusoid, then signal 56 is also a sinusoid. Controller 160 is configured such that the average value of current 20, over the period of voltage 8, is formed to be substantially proportional to the average value of signal 156 and can be represented by the equation:

$$I20,avg=V156avg/(2*N*R34)$$

where;
  I20,avg is the average value of current 20 over the period of voltage 8,
  N is a constant,
  R34 is the value of current sense resistor 34; and
  V156avg is the average value of signal 156.

Controller 44 (FIG. 1) is configured to use signal 156 to control current 20 so that the average value of current 20 over the period of signal 40 has a waveshape that is substantially a sinusoid waveshape instead of the squared sinusoid waveshape. In another embodiment, controller 35 (FIG. 1) is configured to form an average value of current 20 over the period of voltage 8 to be substantially constant.

Those skilled in the art will appreciate that an alternate embodiment may include a controller, for example a controller similar to controller 35 (FIG. 1), that uses circuits similar to both of circuits 43 and 164. For example, circuits 43 and 164 may be configured in parallel to form respective signals 56 and 156 to control the value of current 20.

Figure 8:
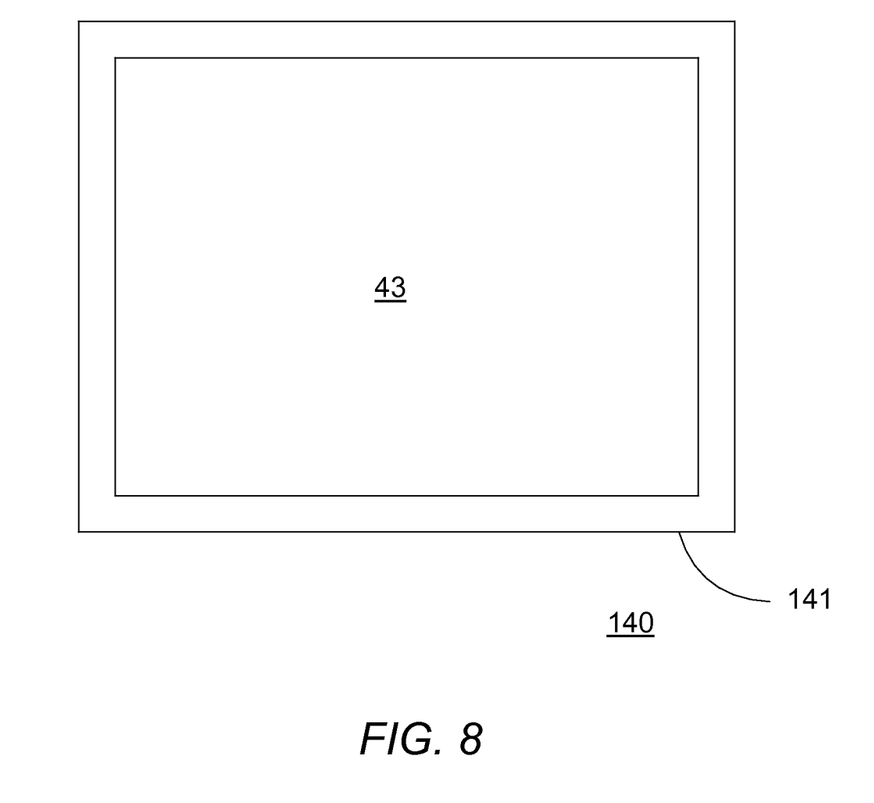
FIG. 8 illustrates an enlarged plan view of a semiconductor device that includes some of the circuits of FIGS. 1-4 and 6-7 in accordance with the present invention.

FIG. 8 illustrates an enlarged plan view of a portion of an embodiment of a semiconductor device or integrated circuit 140 that is formed on a semiconductor die 141. Controllers 35 or 45 and/or any of circuits 43, 50, 60, 90, 114, and/or 160 may be formed on die 141. Die 141 may also include other circuits that are not shown in FIG. 8 for simplicity of the drawing. Controller 35 or 45 and device or integrated circuit 140 are formed on die 141 by semiconductor manufacturing techniques that are well known to those skilled in the art.

From all the foregoing one skilled in the art can determinate that according to one embodiment, a power supply controller may comprise:

an input configured to receive a first signal that is representative of an ac input voltage, the ac input voltage having a first period and having a first waveshape of a sine waveshape; a reference circuit having an input to receive the first signal, the reference circuit configured to form a reference signal having a second waveshape of substantially the first waveshape squared; and a PWM controller circuit configured to form a drive signal to control a switch to form an output current, the drive signal having a second period, the PWM controller circuit configured to use the reference signal to control the switch to form a first average value of the output current over the first period to be substantially constant and form a second average value of the output current over the second period to have a third waveshape that is substantially the squared sine waveshape of the reference signal.

In another embodiment, the first average value of the output current over the first period may be proportional to an average value of reference signal.

Another embodiment may include the reference circuit configured to form an average value of the reference signal over the first period to be substantially constant.

Another embodiment may further include an averaging circuit that is configured to receive the reference signal and form an error signal representing a deviation of the average value of the reference signal from a desired average value of the reference signal Another embodiment may include a multiplier that multiplies the first signal times itself to form the second waveshape.

In another embodiment a reference circuit may modulate a scaling value of the multiplier to control the multiplier to form an average value of the reference signal to be substantially constant.

Those skilled in the art will also appreciate that a method of forming a reference signal may comprise:

configuring the reference circuit to receive a first signal that is representative of an ac input signal that has a first waveshape; and configuring the reference circuit to form a reference signal having a second waveshape that is representative of one of the first waveshape or the first waveshape squared.

In another embodiment, the method may include configuring the reference circuit to form an average value of the reference signal to be substantially constant.

Another embodiment may include configuring the reference circuit to form the reference signal having a waveshape that is substantially a sine waveshape or a sine squared waveshape.

Yet another embodiment may include forming the reference circuit to modulate a scaling value of a multiplier circuit to form an average value of the reference signal to be substantially a predetermined value.

Those skilled in the art will also understand that a method of forming a power supply controller may comprise:

forming the power supply controller to receive a first signal that is representative of an ac input signal having a first period and having a first waveshape, including forming the power supply controller to form a drive signal having a second period to control a power switch to form an output current; and configuring the power supply controller to form a first average value of the output current over the second period with a second waveshape that is one of substantially the first waveshape or the first waveshape squared.

Another embodiment of the method may include configuring a reference circuit of the power supply controller to form a reference signal having a third waveshape that is one of substantially the first waveshape or the first waveshape squared and to have an average value over the first period that is substantially constant.

Another embodiment may include configuring the power supply controller to form a second average value of the output current over the first period to be proportional to the average value of the reference signal.

In another embodiment, the method may include configuring the reference circuit to multiply the first signal times itself to control the reference signal to have the third waveshape of substantially the squared sine waveshape.

Yet another embodiment may include configuring the reference circuit to determine a deviation of the reference signal from a desired average value of the reference signal and to use the deviation to adjust the average value of the reference signal to be substantially a predetermined value.

Another embodiment may include forming an error signal that is representative of a variation of an instantaneous value of the reference signal from the desired average value of the reference signal, to determine an average value of the error signal, and to use the average value of the error signal to adjust the instantaneous value of the reference signal.

Yet another embodiment may include configuring a sample-and-hold circuit to sample a maximum and a minimum value of the error signal, and to sum the sampled maximum and sampled minimum values to determine the average value of the error signal.

Another embodiment may include configuring the sample and hold circuit to determine one of substantially a maximum and a minimum value of the error signal or substantially a positive and a negative variation of the ac input signal from a dc value of the ac input signal.

Those skilled in the art will also understand that the methods may result in a reference circuit that is a described by the method with the word configuring removed and the word configured inserted after the circuit is set out.

In view of all of the above, it is evident that a novel device and method is disclosed. Included, among other features, is forming a power supply controller to control an output current formed by the power supply controller to form an average value of the output current over a period of a drive signal with an envelope waveshape of substantially a squared sine waveshape. In another embodiment, the power supply controller is configured to control the output current to form an average value of the output current over a period of a drive signal with an envelope waveshape of substantially a sine waveshape. Also included is forming the power supply controller to control the output current to form an average value of the output current over a period of an input ac voltage to have a substantially constant average value. Controlling the output current using only information on a primary side of the power supply facilitates controlling the output current without using an optical coupler thereby reducing the cost to the power supply controller and the system that uses the power supply controller. Configuring the power supply controller to use a signal that is representative of an input ac voltage assists in improving the power factor and also may assist in reducing the costs.

While the subject matter of the descriptions are described with specific preferred embodiments and example embodiments, the foregoing drawings and descriptions thereof depict only typical and example embodiments of the subject matter and are not therefore to be considered to be limiting of its scope, it is evident that many alternatives and variations will be apparent to those skilled in the art. As will be appreciated by those skilled in the art, the described example forms of controllers 35 and 45 along with circuits 43, 50, 60, 90, and 114 are used as vehicles to explain the methods and structures. However, other embodiments could also be used. Although controllers 35 and 45 are illustrated in a flyback power supply system application, they may be used in various other well-known types of power supply systems. Signal 33 is explained as being representative of voltage 8 and/or signal 9. In one embodiment, signal 9 has a waveshape that is representative of a rectified sinewave. In other embodiments, an offset voltage may be added to signal 8 or to signal 9 before forming signal 33.

As the claims hereinafter reflect, inventive aspects may lie in less than all features of a single foregoing disclosed embodiment. Thus, the hereinafter expressed claims are hereby expressly incorporated into this Detailed Description of the Drawings, with each claim standing on its own as a separate embodiment of an invention. Furthermore, while some embodiments described herein include some but not other features included in other embodiments, combinations of features of different embodiments are meant to be within the scope of the invention, and form different embodiments, as would be understood by those skilled in the art.

The invention claimed is:

1. A power supply controller comprising:
   an input configured to receive a first signal that is representative of an ac input voltage, the ac input voltage having a first period and having a first waveshape of a sine waveshape;
   a reference circuit including a first amplifier having an input that receives the first signal, the reference circuit configured to form a reference signal having a second waveshape of substantially the first waveshape squared;
   a PWM controller circuit configured to form a drive signal to control a switch to form an output current from a transformer, the drive signal having a second period, the PWM controller circuit configured to use the reference signal to control the switch to form a first average value of the output current over the first period to be substantially constant and form a second average value of the output current over the second period to have a third waveshape that is substantially the squared sine waveshape of the reference signal; and
   wherein the power supply controller is configured to receive from the transformer only signals from a primary winding of the transformer and not signals from a secondary winding.

2. The power supply controller of claim 1 wherein the first average value of the output current over the first period is proportional to an average value of reference signal.

3. The power supply controller of claim 1 wherein the reference circuit is configured to form an average value of the reference signal over the first period to be substantially constant.

4. A power supply controller comprising:
   an input configured to receive a first signal that is representative of an ac input voltage, the ac input voltage having a first period and having a first waveshape of a sine waveshape;
   a reference circuit having an input to receive the first signal, the reference circuit configured to form a reference signal having a second waveshape of substantially the first waveshape squared wherein the reference circuit is configured to form an average value of the reference signal over the first period to be substantially constant;

the reference circuit including an averaging circuit that is configured to receive the reference signal and form an error signal representing a deviation of the average value of the reference signal from a desired average value of the reference signal wherein the averaging circuit includes a sample-and-hold circuit configured to sample a maximum value and a minimum value of the error signal and use the maximum and minimum values of the error signal to adjust the average value of the reference signal; and a PWM controller circuit configured to form a drive signal to control a switch to form an output current, the drive signal having a second period, the PWM controller circuit configured to use the reference signal to control the switch to form a first average value of the output current over the first period to be substantially constant and form a second average value of the output current over the second period to have a third waveshape that is substantially the squared sine waveshape of the reference signal.

5. The power supply controller of claim 4 wherein the sample-and-hold circuit is configured to detect the maximum and minimum values of the error signal and to sample a value of the error signal to alternate capacitors responsively to alternate detections of the maximum and minimum values of the error signal.

6. The power supply controller of claim 1 wherein the reference circuit includes a multiplier that multiplies the first signal times itself to form the second waveshape.

7. The power supply controller of claim 6 wherein the reference circuit is configured to modulate a scaling value of the multiplier to control the multiplier to form an average value of the reference signal to be substantially constant.

8. A method of forming a reference circuit comprising:
configuring the reference circuit to receive a first signal that is representative of an ac input signal that has a first waveshape;
configuring the reference circuit to form a reference signal having a second waveshape that is representative of one of the first waveshape squared or the first waveshape including forming the reference circuit to modulate a scaling value of a multiplier circuit to form an average value of the reference signal to be substantially a predetermined value;
configuring a first circuit to use the reference signal form a drive signal to control a switch to form an output current; and
configuring the reference circuit to form the reference signal independently of an enabled or disabled state of the switch.

9. The method of claim 8 wherein configuring the reference circuit to form the reference signal includes configuring the reference circuit to form an average value of the reference signal to be substantially constant.

10. The method of claim 8 wherein configuring the reference circuit to form the reference signal includes forming the reference circuit to multiply the first signal times itself.

11. A method of forming a power supply controller comprising:
forming the power supply controller to receive a first signal that is representative of an ac input signal having a first period and having a first waveshape, including forming the power supply controller to form a drive signal having a second period to control a power switch to form an output current;
configuring the power supply controller to form a first average value of the output current over the second period with a second waveshape that is one of substantially the first waveshape or the first waveshape squared;
configuring a reference circuit of the power supply controller to form a reference signal having a third waveshape that is one of substantially the first waveshape or the first waveshape squared and to have an average value over the first period that is substantially constant;
configuring the reference circuit to determine a deviation of the reference signal from a desired average value of the reference signal and to use the deviation to adjust the average value of the reference signal to be substantially a predetermined value;
configuring the reference circuit to form an error signal that is representative of a variation of an instantaneous value of the reference signal from the desired average value of the reference signal, to determine an average value of the error signal, and to use the average value of the error signal to adjust the instantaneous value of the reference signal; and
configuring a sample-and-hold circuit to sample a maximum and a minimum value of the error signal, and to sum the sampled maximum and sampled minimum values to determine the average value of the error signal.

12. The method of claim 11 further including configuring the power supply controller to form a second average value of the output current over the first period to be proportional to the average value of the reference signal.

13. The method of claim 11 wherein configuring the reference circuit of the power supply controller to form the reference signal includes configuring the reference circuit to multiply the first signal times itself to control the reference signal to have the third waveshape of substantially the squared sine waveshape.

14. The method of claim 11 wherein configuring the sample-and-hold circuit includes configuring the sample and hold circuit to determine one of substantially a maximum and a minimum value of the error signal or substantially a positive and a negative variation of the ac input signal from a respective maximum or minimum value.

15. The power supply controller of claim 1 wherein the input of the first amplifier is coupled to directly receive the first signal.

16. The power supply controller of claim 1 wherein the first amplifier is configured to form an error signal representing a deviation of the average value of the reference signal from a desired average value of the reference signal;
the averaging circuit further including a second amplifier configured to receive the error signal and form a correction signal; and
the power supply controller further including a multiplier having a scaling input that is configured to receive the correction signal and responsively modulates a scaling of the multiplier in response to the correction signal.

17. The method of claim 8 further including configuring first amplifier of the reference circuit to directly receive the first signal and form an error signal representing a deviation of the average value of the reference signal from a desired average value of the reference signal.

18. The method of claim 17 further including configuring a second amplifier of the reference circuit to receive the error signal and form a correction signal wherein the reference circuit adjusts a value of the reference signal in response to the correction signal.

19. The power supply controller of claim 1 wherein the reference circuit is configured to form the reference signal independently of the enabled or disabled state of the switch that is controlled by the drive signal.

20. The method of claim 8 further including configuring a PWM controller circuit to use the reference signal to form the drive signal to form an output current from a transformer and to form the reference signal using only signals from a primary winding of the transformer.

\* \* \* \* \*